(12) United States Patent
Boiroux et al.

(10) Patent No.: US 10,493,908 B2
(45) Date of Patent: Dec. 3, 2019

(54) LIGHTING MODULE FOR THE PASSENGER COMPARTMENT OF A MOTOR VEHICLE

(71) Applicant: VALEO VISION, Bobigny (FR)

(72) Inventors: Nicolas Boiroux, Bobigny (FR); Philippe Cazenave, Bobigny (FR); Slim Rjeb, Bobigny (FR)

(73) Assignee: VALEO VISION, Bobigny (FR)

( * ) Notice: Subject to any disclaimer, the term of this patent is extended or adjusted under 35 U.S.C. 154(b) by 85 days.

(21) Appl. No.: 15/566,532

(22) PCT Filed: Apr. 11, 2016

(86) PCT No.: PCT/EP2016/057937
§ 371 (c)(1),
(2) Date: Oct. 13, 2017

(87) PCT Pub. No.: WO2016/166065
PCT Pub. Date: Oct. 20, 2016

(65) Prior Publication Data
US 2018/0134213 A1 May 17, 2018

(30) Foreign Application Priority Data
Apr. 14, 2015 (FR) .................................... 1553251

(51) Int. Cl.
*B60Q 3/80* (2017.01)
*B60Q 3/74* (2017.01)
(Continued)

(52) U.S. Cl.
CPC ................. *B60Q 3/80* (2017.02); *B60Q 3/50* (2017.02); *B60Q 3/62* (2017.02); *B60Q 3/74* (2017.02);
(Continued)

(58) Field of Classification Search
CPC ... B60Q 3/80; B60Q 3/62; B60Q 3/50; B60Q 3/74; B60Q 3/00; B60Q 3/20; B60Q 3/51;
(Continued)

(56) References Cited

U.S. PATENT DOCUMENTS

| 4,847,737 A | * | 7/1989 | Van Order | ............. | B60J 3/0282 362/137 |
| 5,803,579 A | * | 9/1998 | Turnbull | ................... | B60L 1/14 362/516 |

(Continued)

OTHER PUBLICATIONS

International Search Report dated Jun. 16, 2016 in PCT/EP2016/057937 filed Apr. 11, 2016.
(Continued)

*Primary Examiner* — Bao Q Truong
(74) *Attorney, Agent, or Firm* — Oblon, McClelland, Maier & Neustadt, L.L.P.

(57) ABSTRACT

A lighting module for the passenger compartment of a motor vehicle includes a housing and light-emitting means arranged in the housing and able to emit a lighting light beam having a wavelength selectively chosen from at least two distinct predetermined wavelengths. Electronic control means for controlling the light-emitting means are arranged to control the emission of the lighting beam with the chosen wavelength. Also included are support for electrical interconnection carrying the light-emitting means and the control means and interconnecting same, electrical connection means for electrical connection of the light-emitting means and/or the electronic control means to the outside of the housing, and optical interface means for guiding the lighting beam outside of the housing.

15 Claims, 2 Drawing Sheets

(51) Int. Cl.
*B60Q 3/62* (2017.01)
*B60Q 3/50* (2017.01)
*F21V 23/06* (2006.01)
*H05B 33/08* (2006.01)
*F21Y 113/10* (2016.01)
*F21Y 115/10* (2016.01)

(52) U.S. Cl.
CPC ......... *F21V 23/06* (2013.01); *H05B 33/0851* (2013.01); *H05B 33/0866* (2013.01); *F21Y 2113/10* (2016.08); *F21Y 2115/10* (2016.08)

(58) Field of Classification Search
CPC .......... F21V 23/06; F21V 15/00; F21V 15/01; F21V 15/015; F21V 2200/00; F21V 2200/13; H05B 33/0851; H05B 33/0866; F21Y 2113/10; F21Y 2215/10; F21W 2106/00
See application file for complete search history.

(56) References Cited

U.S. PATENT DOCUMENTS

| | | | |
|---|---|---|---|
| 6,132,072 A | 10/2000 | Turnbull et al. | |
| 6,152,590 A | 11/2000 | Fürst et al. | |
| 6,158,882 A | 12/2000 | Bischoff, Jr. | |
| 6,347,880 B1 | 2/2002 | Fürst et al. | |
| 6,402,354 B1* | 6/2002 | Tatewaki | B60Q 3/74 362/234 |
| 6,523,976 B1 | 2/2003 | Turnbull et al. | |
| 2002/0041498 A1 | 4/2002 | Fürst et al. | |
| 2003/0133302 A1 | 7/2003 | Kamiya et al. | |
| 2003/0156425 A1 | 8/2003 | Turnbull et al. | |
| 2006/0092659 A1 | 5/2006 | Bynum | |
| 2007/0047246 A1* | 3/2007 | Barowski | B60Q 1/302 362/488 |
| 2009/0129100 A1* | 5/2009 | Goto | F21V 21/04 362/368 |
| 2010/0188838 A1 | 7/2010 | Yajima et al. | |
| 2011/0222302 A1* | 9/2011 | Hodgson | B60Q 3/82 362/490 |

OTHER PUBLICATIONS

French Preliminary Search Report dated Feb. 10, 2016 in Patent Application No. 1553251 filed Apr. 14, 2015.

* cited by examiner

LIGHTING MODULE FOR THE PASSENGER COMPARTMENT OF A MOTOR VEHICLE

TECHNICAL FIELD OF THE INVENTION

The invention concerns a module for lighting the passenger compartment of a motor vehicle.

TECHNICAL BACKGROUND OF THE INVENTION

In the field of lighting the passenger compartment of a motor vehicle, it is known to use conventional filament bulbs as light sources. However, in the automotive field as in other fields, light-emitting diodes (LEDs), which are semiconductor components, are being used increasingly frequently as light sources, notably for reasons of consumption. Either monochromatic lighting is then produced or a set of LEDs emitting red, green and blue light is used to obtain white light or light of any other color at will as a function of the control signal applied to the LEDs.

However, if it is required to control the light spectrum of the lighting and if it is moreover required that this spectrum be stable over time, i.e. notably with temperature, that necessitates electronic control circuits that require space to be available, notably for the optical and electrical inputs/outputs, which commensurately reduces the space available inside the vehicle, space always being an important parameter for a motor vehicle.

SUMMARY OF THE INVENTION

The object of the invention is to produce a module for lighting the passenger compartment of a motor vehicle that is compact, is closed to prevent light leaks and can be manufactured industrially at minimum cost.

To this end, the invention consists in a module for lighting the passenger compartment of a motor vehicle, including:
  a housing,
  light-emitting means disposed in the housing and adapted to emit a lighting light beam having a wavelength selectively chosen from at least two different predetermined wavelengths,
  electronic control means for the light-emitting means adapted to control the emission of the lighting beam with the chosen wavelength,
  an electrical interconnection support carrying and interconnecting the light-emitting means and the control module,
  electrical means for connecting the light-emitting means and/or the electronic control means with the outside of the housing,
  optical interface means for guiding the lighting beam out of the housing.

In this way, the housing according to the invention that contains the light sources and their control electronics is light-tight, compact and easy and therefore relatively cheap to produce industrially.

According to various embodiments of the invention, separately or in combination:
  the light-emitting means include at least two light-emitting semiconductor dies emitting light at different wavelengths;
  the light-emitting means include three light-emitting semiconductor dies emitting red, blue and green light, respectively;
  the light-emitting dies are light-emitting diodes;
  the housing further includes temperature sensing means, intended to sense the temperature of the light-emitting means and connected to the electronic control means;
  the temperature sensing means are intended to sense the temperature in the vicinity of the light-emitting means;
  the temperature sensing means include a negative temperature coefficient thermistor;
  the housing further includes electrical protection circuits carried by the interconnection support and connected between the electronic control means and the electrical connection means;
  the housing includes a base and a lid, the lid being configured to cooperate with the base so as to close the housing;
  the lid is configured to cooperate with the base so as to close the housing in light-tight manner;
  the interconnection support is configured to be disposed in the base;
  the connection means are disposed on the same face of the interconnection support,
  the electrical connection means, the base and the lid are configured so that the connection means and/or the interconnection support are mechanically retained when the housing is closed;
  the housing includes a hinge between the base and the lid adapted to allow rotation of the lid relative to the base between a position in which the housing is open and a position in which the housing is closed;
  the housing can advantageously be produced in a plastic material; if necessary, the base, the lid and the hinge can be produced in the same material;
  the connection means are intended to cooperate with a connector to receive instructions commanding the emission of a light beam with a chosen predetermined wavelength; if necessary, the electronic control means are adapted to control the emission of the lighting beam so that the beam has a wavelength corresponding to said chosen predetermined wavelength; in one example, the connection means include a plurality of conductive lands, to each of which at least one connecting wire is electrically connected; if necessary, the various wires are inserted into a terminal strip terminating in the same number of connecting pins or contacts;
  the electrical interconnection support and the optical interface means are disposed in the housing; the base preferably includes a first compartment intended to receive the electrical interconnection support;
  the base includes on one of its faces an optical opening facing the light-emitting means and adapted to cooperate with the optical interface means to guide the lighting beam out of the housing;
  the base can include a second compartment one side of which includes an opening, the second compartment being intended to receive at least part of the connecting means and said connector so as to guarantee the mechanical contact between the connection means and the connector;
  if necessary, the base can include a slot intended to cooperate with said connector, for example with a lug of said connector, so as to prevent unplugging of said connector;
  said slot is for example produced in an overthickness of a face of the compartment of the base and is disposed facing said part of the connection means disposed in the second compartment;

the lid includes a first plate the size of which is equal to that of an upper face of the base so as to close the latter in a manner that does not allow light to pass;

the lid preferably further includes a first referencing plate, for example formed by an overthickness of the first plate, disposed on its interior face, corresponding to the dimensions of the first compartment of the base and intended to fit in the first compartment when the housing is closed;

the lid can include a second referencing plate, for example formed by an overthickness of the first plate, disposed on its interior face, corresponding to the dimensions of the second compartment of the base and intended to fit in the second compartment on closing the housing;

the base includes no means for retaining the interconnection support in position;

for example, the lid may again include retaining lugs, formed for example on the first referencing plate and intended to come to bear on the interconnection support so as to retain the latter in position mechanically when the lid is closed onto the base;

the lid preferably further includes a retaining plate, formed for example by an overthickness of the second referencing plate and intended to come to bear on a part of the connection means so as to retain the latter in position mechanically when the lid is closed onto the base;

the lid is configured to cooperate with the base in clipping fashion.

BRIEF DESCRIPTION OF THE FIGURES

Other features and advantages of the invention will emerge from the following detailed description, provided by way of illustration and illustrated by the appended drawings, which show.

In the various figures, the same references relate to the same elements.

DETAILED DESCRIPTION OF THE FIGURES

Figure 1:
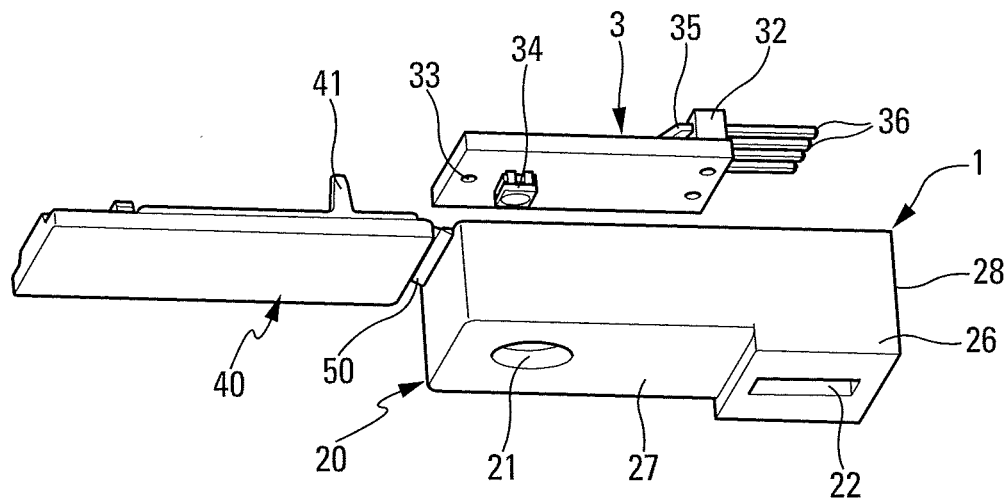
FIG. 1, an exploded perspective view of one embodiment of the lighting housing according to the invention.
Figure 2:
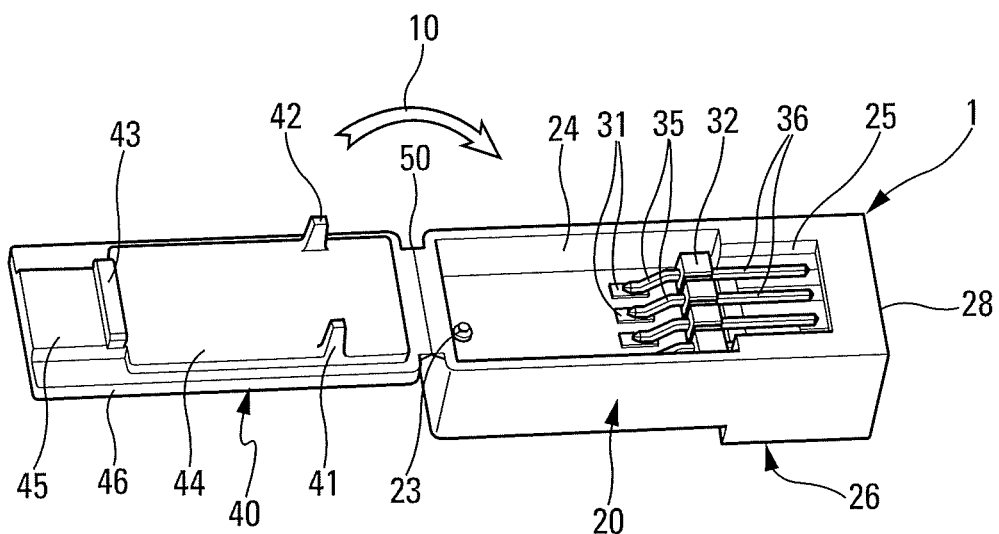
FIG. 2, another perspective view of the lighting housing from FIG. 1.

Thus FIG. 1 is an exploded perspective view from below of the lighting module according to one embodiment of the invention in the open position and FIG. 2 is a perspective view of the same housing, again in the open position but seen from above.

These figures show the lighting module including a housing 1 including a base 20 and a lid 40 intended to be positioned on the base 20 to form the housing. The housing includes a hinge 50 between the base 20 and the lid 40 adapted to allow rotation of the lid relative to the base between a position in which the housing is open and a position in which the housing is closed, as indicated by an arrow 10 in FIG. 2. The housing 1 is produced in a plastic material, for example; in this case, the base, the lid and the hinge can be produced in the same material.

The housing 1 is intended to receive an electronic circuit, disposed for example on an electrical interconnection support 3, such as a printed circuit card, the card 3 carrying light-emitting means emitting a lighting light beam, where applicable including optical interface means 34 shown diagrammatically and carried by the printed circuit card 3 and electronic control means for the light-emitting means, as described in more detail with reference to FIG. 3.

The electronic circuit carried by the card 3 is electrically connected to the outside of the housing by connecting means. These connecting means include a set of conductive lands 31, for example four of them, to each of which is electrically connected a connecting wire 35; the various wires 35 are inserted in a terminal strip 32 terminating in as many connecting pins or contacts 36, here four of them.

The overall shape of the base 20 is for example a rectangular parallelepiped the sixth face of which, the upper face in FIGS. 1 and 2, is open and intended to receive the lid 40. Its lower face 27 opposite the upper face includes for example two openings 21 and 22, the opening 21 having the function of optical interconnection of the housing 1 with the outside. The opening 22, in the form of a slot, for example, is produced for example in an overthickness 26 of the lower face 27 of the base 20 and disposed facing the contacts 36 of the printed circuit card 3; the opening 22 is intended to cooperate with said connector, for example with a clipping lug of the connector, so as to prevent unplugging of the connector. The base further includes an opening on one of its sides, for example the shorter side 28 opposite that carrying the hinge 50, for the electrical interconnection of the housing 1 with the outside.

In FIG. 2 it is seen that the base includes two compartments, for example, one compartment 24 intended to receive the printed circuit card 3 and the smaller second compartment 25 intended to receive at least part of the connection means of the card 3, namely the contacts 36 in the example shown in the figures. The connection means of the housing 1, including the contacts 36, are intended to cooperate with a connector to receive instructions commanding the emission of a light beam of chosen predetermined wavelength. The second compartment is intended also to receive this connector so as to guarantee the mechanical contact between the connection means and the connector.

The lid 40 includes a plate 46 the size of which is equal to that of the upper face of the base 20 so as to close the latter in a manner that does not allow light to pass. It preferably further includes a second so-called referencing plate or overthickness 44 disposed on its interior face and corresponding to the dimensions of the compartment 24 of the base, intended to fit in the compartment 24 when the housing is closed. Similarly, the lid includes a third referencing plate or overthickness 45 intended to cooperate with the compartment 25 of the base. The elements 44 and 45 enable correct and light-tight positioning of the lid 40 on the base 20. The lid 40 preferably further includes an overthickness 43 disposed for example on the part 45 so as to bear on the terminal strip 32 and to hold the latter in place mechanically when the lid 40 is closed onto the base 20. The lid 40 can further include lugs 41 and 42 cooperating with the base on closing the housing and to be more precise intended to come to bear on the connection support 3 so as to retain the latter in place mechanically when the lid 40 is closed onto the base 20.

Figure 3:
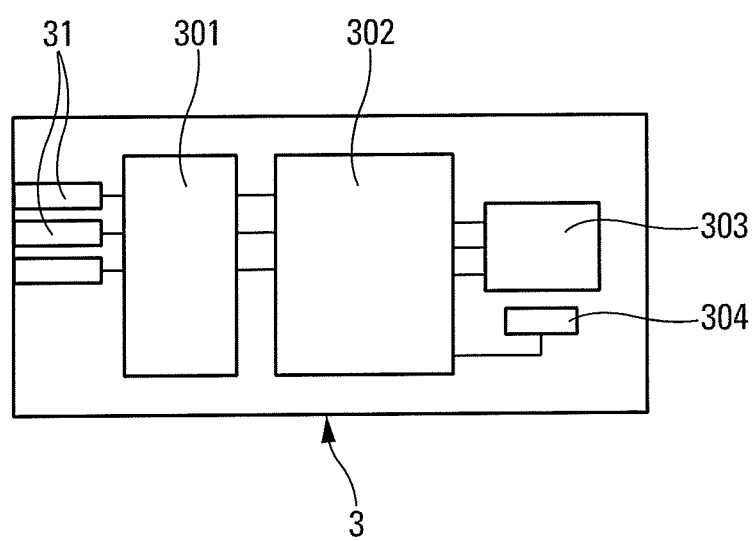
FIG. 3, a diagrammatic view of one embodiment of the electronic circuit used in the lighting housing according to the invention.

FIG. 3 is a diagrammatic view of one embodiment of the electronic circuit used in the lighting housing 1.

This figure shows a face of the printed circuit card 3 on which the conductive lands 31 are found, for example three of them. These lands respectively receive for example the electrical power supply (voltage and ground) and the control signals circulating over the communication network of the vehicle, for example of LIN type.

The card 3 includes electronic control means 302, for example a microprocessor, preferably connected to the lands 31 via electrical protection circuits 301 notably protecting the components against overvoltages.

The microprocessor 302 controls and monitors light-emitting means 303 emitting a lighting light beam including at least two different wavelengths; these emitting means include for example light-emitting semiconductor dies, preferably light-emitting diodes (LEDs), for example three LEDs respectively emitting red, green and blue light so as to be able, by combining the emissions from the means 302 on command, to obtain white light or light of any other chosen color. The light-emitting means are disposed so that the lighting beam emitted by them is emitted on the other side of the printed circuit card 3, as shown in FIG. 1. In a variant embodiment, it is possible to dispose all of the electronic components, including the LEDs, on the same face of the printed circuit card 3.

The connection means 31, 32, 35 and 36 are intended to cooperate with a connector to receive instructions commanding emission of the light beam of chosen predetermined wavelength. If necessary, the electronic control means 302 are adapted to control the emission of the lighting beam so that the beam has a wavelength corresponding to said chosen predetermined wavelength.

The card 3 preferably further carries temperature sensing means 304 intended to sense the temperature of the light-emitting means and connected to the microprocessor 302: in fact, the light emitted and notably its wavelength are liable to vary with temperature and controlling the light spectrum emitted by the set of LEDs necessitates correction of the intensities emitted by each of them as a function of temperature.

The temperature sensing means include for example a negative temperature coefficient thermistor disposed in the vicinity of the light-emitting means and connected to the control means 302. The advantage of using a component of this kind is its limited cost, its accuracy matching the application concerned.

The invention claimed is:

1. A lighting module for the passenger compartment of a motor vehicle, wherein the lighting module includes:
    a housing,
    a light-emitter disposed in the housing and which emits a light beam having a wavelength selectively chosen from at least two different predetermined wavelengths,
    an electronic controller for the light-emitter that controls the emission of the light beam with the chosen wavelength,
    an electrical interconnection support carrying and interconnecting the light-emitter and the electronic controller,
    an electrical connector that connects the light-emitter and/or the electronic controller to outside of the housing,
    an optical interface guide that guides the light beam out of the housing;
    a base;
    a lid, the lid being configured to cooperate with the base to close the housing; and
    wherein the electrical connector comprises a terminal strip that includes an upper surface, and
    wherein the lid comprises an overthickness portion that extends from a surface of the lid and which contacts and presses on the upper surface of the terminal strip when the electrical interconnection support is disposed within the base and when the lid is closed onto the base.

2. The module as claimed in claim 1, wherein the light-emitter includes at least two light-emitting semiconductor dies emitting light at different wavelengths.

3. The lighting module as claimed in claim 2, wherein the light-emitter includes three light-emitting semiconductor dies emitting red, blue and green light, respectively.

4. The lighting module as claimed in claim 2, wherein the light-emitting dies are light-emitting diodes.

5. The lighting module as claimed in claim 1, wherein the interconnection support is insertable in the base.

6. The lighting module as claimed in claim 5, wherein the electrical connector and/or the interconnection support are mechanically retained within the base when the housing is closed by the lid.

7. The lighting module as claimed in claim 3, wherein the light-emitting dies are light-emitting diodes.

8. The lighting module as claimed claim 2, wherein the lighting module further includes a temperature sensor that senses the temperature of the light-emitter and is connected to the electronic controller.

9. The lighting module as claimed in claim 8, wherein the temperature sensor includes a negative temperature coefficient thermistor.

10. The lighting module as claimed in claim 2, wherein the lighting module further includes electrical protection circuits carried by the interconnection support and connected between the electronic controller and the electrical connector.

11. The lighting module as claimed in claim 3, wherein the lighting module further includes a temperature sensor that senses the temperature of the light-emitter and is connected to the electronic controller.

12. The lighting module as claimed in claim 3, wherein the temperature sensor includes a negative temperature coefficient thermistor.

13. The lighting module as claimed in claim 3, wherein the lighting module further includes electrical protection circuits carried by the interconnection support and connected between the electronic controller and the electrical connector.

14. The lighting module as claimed in claim 4, wherein the lighting module further includes a temperature sensor that senses the temperature of the light-emitter and is connected to the electronic controller.

15. The lighting module as claimed in claim 1, wherein the lid further comprises a referencing plate that corresponds to interior dimensions of the base to provide a light-tight seal between the lid on the base.

* * * * *